(12) United States Patent
Teuwen et al.

(10) Patent No.: US 9,465,926 B2
(45) Date of Patent: Oct. 11, 2016

(54) METHOD OF OBFUSCATING A CODE

(75) Inventors: Philippe Teuwen, Ixelles (BE);
Ventzislav Nikov, Haasrode (BE)

(73) Assignee: NXP B.V., Eindhoven (NL)

( * ) Notice: Subject to any disclaimer, the term of this patent is extended or adjusted under 35 U.S.C. 154(b) by 1219 days.

(21) Appl. No.: 12/869,622

(22) Filed: Aug. 26, 2010

(65) Prior Publication Data

US 2011/0055592 A1 Mar. 3, 2011

(30) Foreign Application Priority Data

Aug. 26, 2009 (EP) .................................... 09168753

(51) Int. Cl.
| | | |
|---|---|---|
| *G06F 21/00* | (2013.01) | |
| *H04L 29/06* | (2006.01) | |
| *G06F 12/14* | (2006.01) | |
| *G06F 21/12* | (2013.01) | |
| *G06F 21/14* | (2013.01) | |

(52) U.S. Cl.
CPC ......... *G06F 21/121* (2013.01); *G06F 12/1408* (2013.01); *G06F 21/14* (2013.01)

(58) Field of Classification Search
CPC ... G06F 21/121; G06F 21/14; G06F 12/1408
USPC .................................. 713/190; 711/206, 203
See application file for complete search history.

(56) References Cited

U.S. PATENT DOCUMENTS

| | | |
|---|---|---|
| 5,559,884 A | 9/1996 | Davidson et al. |
| 2006/0195703 A1* | 8/2006 | Jakubowski .................. 713/190 |
| 2007/0250719 A1 | 10/2007 | Lai et al. |

FOREIGN PATENT DOCUMENTS

| | | | | |
|---|---|---|---|---|
| BE | WO 2009101562 A2 * | 8/2009 | ............. | G06F 21/14 |
| FR | WO 2010020603 A1 * | 2/2010 | ............. | G06F 21/14 |
| WO | 01 79969 A | 10/2001 | | |
| WO | 2009 098630 A1 | 8/2009 | | |
| WO | 2009 101562 A2 | 8/2009 | | |
| WO | WO 2009101562 A2 * | 8/2009 | | |

OTHER PUBLICATIONS

Cullen Linn, Saumya Debray; "Obfuscation of executable code to improve resistance to static disassembly"; Oct. 2003; CCS '03: Proceedings of the 10th ACM conference on Computer and communications security; Publisher: ACM; pp. 290-299.*
'DS5002FP Secure Microprocessor Chip,' Maxim Integrated Products, (2006 ).
European Extended Search Report for EP Patent Appln. 09168753.3 (Feb. 17, 2010).

* cited by examiner

*Primary Examiner* — Andrew Nalven
*Assistant Examiner* — Courtney Fields

(57) ABSTRACT

A method of obfuscating a code is provided, wherein the method comprises performing a first level obfuscating technique on a code to generate a first obfuscated code, and performing a second level obfuscating technique on the first obfuscated code. In particular, the code may be a software code or a software module. Furthermore, the first level obfuscating technique and the second obfuscating may be different. In particular, the second level obfuscating technique may perform a deobfuscation.

26 Claims, 1 Drawing Sheet

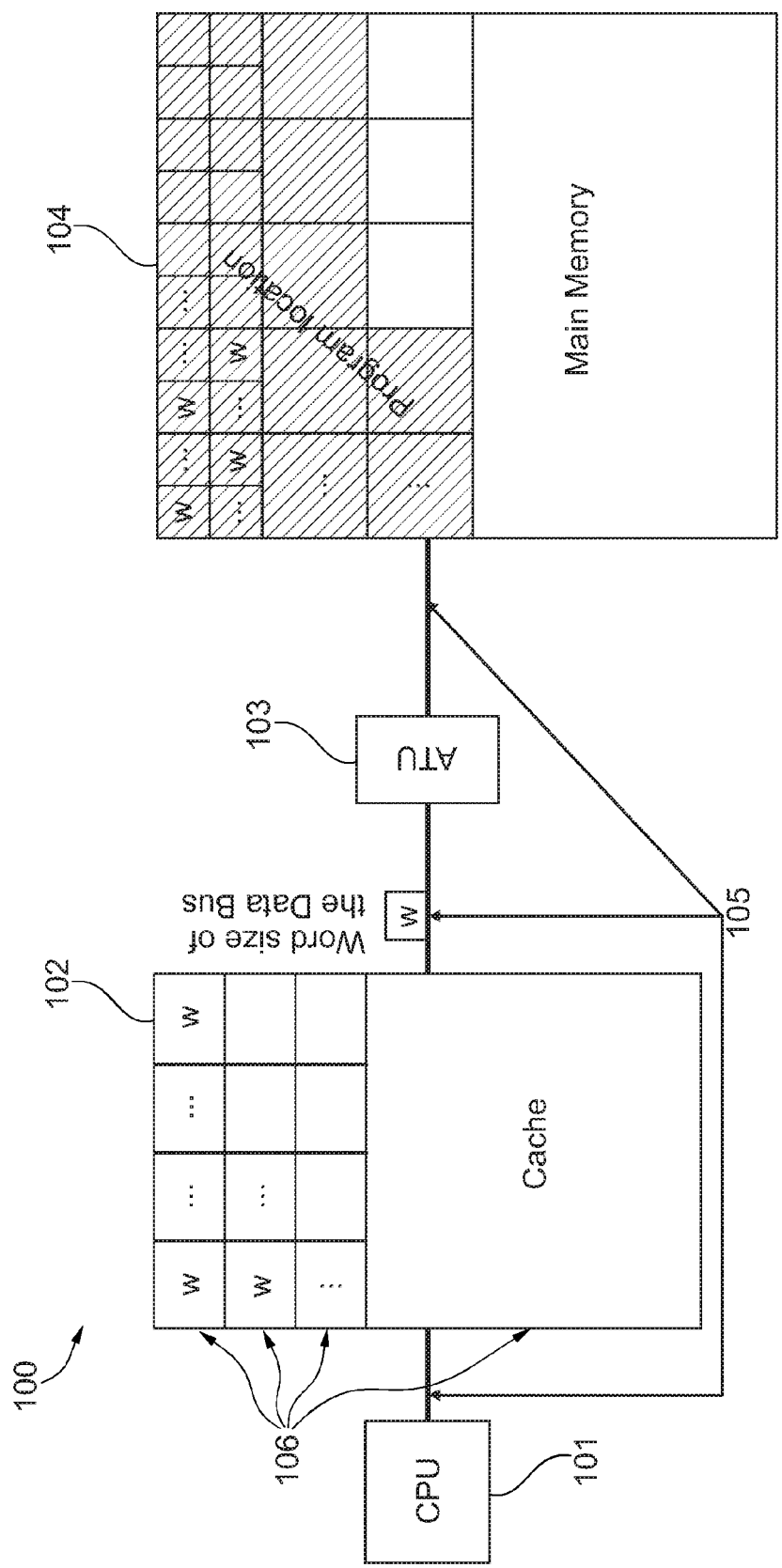

METHOD OF OBFUSCATING A CODE

This application claims the priority of European Patent application no. EP09168753.3, filed on Aug. 26, 2009, the contents of which are incorporated by reference herein.

FIELD OF THE INVENTION

The invention relates a method of obfuscating a code, in particular a software module. Beyond this, the invention relates to a processor system for obfuscating a code. Moreover, the invention relates to a computer readable medium. Furthermore, the invention relates to a program element.

BACKGROUND OF THE INVENTION

Obfuscation is a technique used to complicate code. Obfuscation makes code harder to understand when it is de-compiled, but it typically has no affect on the functionality of the code. In particular, obfuscated code is source code in a computer programming language that has been made difficult to understand. Programmers may deliberately obfuscate code to conceal its purpose, i.e. a form of security through obscurity, to deter reverse engineering, or as a puzzle or recreational challenge for readers. Programs known as obfuscators transform human-readable code into obfuscated code using various techniques. Obfuscating code to prevent reverse engineering is typically done to manage risks that stem from unauthorized access to source code. These risks include loss of intellectual property, ease of probing for application vulnerabilities and loss of revenue that can result when applications are reverse engineered, modified to circumvent metering or usage control and then recompiled. Obfuscating code is, therefore, also a compensating control to manage these risks.

There are known a plurality of obfuscation methods or techniques, relaying of different principles.

SUMMARY OF THE INVENTION

However, there may be a need to provide an alternate or additional obfuscation method, a processing system for performing an obfuscation method, a computer readable element, and a program element which may exhibit an improved performance.

In order to meet the need defined above, a method of obfuscation a code, a processor system, a computer readable medium and a program element according to the independent claims are provided. Further improvements are disclosed in the dependent claims.

According to an exemplary aspect of the invention a method of obfuscating a code is provided, wherein the method comprises performing a first level obfuscating technique on a code to generate a first obfuscated code, and performing a second level obfuscating technique on the first obfuscated code. In particular, the code may be a software code or a software module. Furthermore, the first level obfuscating technique and the second obfuscating may be different.

According to an exemplary aspect of the invention a processing system is provided which comprises a processor with a cache, an external memory, and an address translation unit, wherein the address translation unit is arranged between the cache and the external memory, and wherein the processing system is adapted to perform a method according to an exemplary aspect. The address translation unit may be used to implement an address translation between original address spaces and obfuscated address spaces and may support execution of obfuscated programs, e.g. programs with an obfuscated address space.

According to an exemplary aspect of the invention a program element is provided, which, when being executed by a processor, is adapted to control or carry out a method according to an exemplary aspect.

According to an exemplary aspect of the invention a computer-readable medium is provided, in which a computer program is stored which, when being executed by a processor, is adapted to control or carry out a method according to an exemplary aspect.

By providing an obfuscation or obfuscating method based on two level obfuscation techniques a multilevel obfuscation method may be provided which may increase the flexibility and/or the security of the obfuscation of software code or the like. Furthermore, it may be particularly easy to provide a hybrid obfuscation method by implementing one of the obfuscation methods as a hardware technique while the other one may be implemented as a software technique. However, both may be hardware and/or software techniques. The use of two techniques may also provide for an improved flexibility in adjusting the obfuscation method to specific circumstances, e.g. the both techniques may preserve locality of the obfuscation to a different extend.

Next, further exemplary embodiments of the method of obfuscation are described. However, these embodiments also apply to the processing system, the computer-readable medium, and the program element.

According to another exemplary embodiment of the method one of the obfuscating techniques is based on a hardware technique. In particular, both, additionally used or all used obfuscating techniques may be based on a hardware technique.

According to another exemplary embodiment of the method the one obfuscating technique is performed by using an address translation unit. In particular, the address translation unit may map an address relating to an address space, e.g. an address space of the execution path, to an obfuscated address space, e.g. for retrieving the obfuscated code from a memory. The mapping may be performed in such a way that a caching efficiency of a processor is not harmed, e.g. the efficiency is decreased not at all or only slightly, e.g. less then 20% or less than 10%.

According to another exemplary embodiment of the method the other one of the obfuscating techniques is based on a software technique. In particular, a so-called hybrid hardware/software technique may be provided by the two level obfuscating method. In particular, in the case of more than two used obfuscating methods more than one of the obfuscating methods may be based in a software technique.

According to another exemplary embodiment of the method one of the first level obfuscating technique and of the second level obfuscating technique comprises a mapping step, wherein the mapping is performed between an address space of an execution path and an obfuscated address space for retrieving the obfuscated code from a memory. In particular, a parametric mapping function between unobfuscated and obfuscated addresses may be used.

According to another exemplary embodiment of the method the mapping is based on a space filling curve.

The use of a space filling curve for a mapping, e.g. an address translation unit, may ensure that some locality in a cache line may be conserved.

According to another exemplary embodiment of the method one of the first level obfuscating technique and of the second level obfuscating technique comprises a mapping step, wherein the mapping step is based in a parametric mapping function using a secret as a parameter of the mapping function. In particular, the secret may be a unique secret contained in an address translation unit which may perform the mapping step. A secret may be any kind of information, data or key. For example, the secret may be known to a secure software development environment and to an introduced address translation unit. Such a specific secret may be suitable to bind the resulting obfuscated software code to a given chip (one secret per processor), to the chips on a wafer (one secret per wafer), to the processors in a batch (one secret per batch of chips) or to the processors for a given customer and/or application (one secret per customer and/or application) by using the secret as a parameter of the mappings, i.e. there may be a unique obfuscation per secret.

According to another exemplary embodiment of the method the first level obfuscating technique reorders code blocks with a size of a cache line, and/or wherein the second level obfuscating technique is based on a local permutation inside the each code block. That is, the first level obfuscating technique may map a block of memory to a cache line and/or the second level obfuscating technique may reorder the cache lines to memory blocks. Suitable examples of permutations used for the first and/or second level obfuscating technique may be block and stream ciphers, hash functions or message authentication code.

According to another exemplary embodiment of the method the obfuscated code of the second level obfuscating technique is used as an additional input for the obfuscation of the first level obfuscating technique.

Such a combined two level obfuscation method may ensure a high level of security, which may be higher than using just one level of obfuscation.

Alternatively, the two levels of obfuscation may be performed independently, e.g. the address space is divided into two separate parts.

According to another exemplary embodiment the method further comprises performing of a third level obfuscating technique. For example, the third level obfuscating technique may be the addition of unnecessary code, the use of opaque data types, elimination or opaque making of symbol names, dynamic code generation, or the like. It should be noted that of course a higher level obfuscating technique may be used, i.e. a fourth level, fifth level or so on may be used.

Summarizing, a gist of an exemplary aspect may be seen in providing a method and a processing system for protecting a software code, wherein the system comprises a processor with a cache and an external memory. Furthermore, a secret known to a secure software development environment and to an additional hardware device, e.g. an address translation unit (ATU), may be provided. Such a system may be suitable to prevent reverse engineering of the software code as delivered for the target platform by obfuscating the control flow of the code using a two layers mapping between the address spaces of the original software code and the obfuscated software code, and may further provide a way to bind the resulting obfuscated software code to a given chip (one secret per processor), to the chips on a wafer (one secret per wafer), to the processors in a batch (one secret per batch of chips) or to the processors for a given customer and/or application (one secret per customer and/or application) by using the secret as a parameter of the mappings, i.e. there is unique obfuscation per secret. Additionally, such a system or method may provide a way to tattoo, mark or label the software for further investigations. In particular, the presence of a cache may enable an efficient approach to obfuscate the program flow, namely two levels—each using different techniques. The method may be used among others in system on chip (SoC) designs.

The ATU may implement the address translation between the original and obfuscated address spaces. That is, the ATU obfuscates the address space by encrypting the address bus. If the ATU is placed between the processor cache and the memory containing the obfuscated code, the processor (the cache) may be completely shielded from the obfuscation. The ATU translates the addresses in case cache is present. When encryption of the address space is used it should be considered that such an encryption or obfuscating may destroy locality of the program code, which may degrading cache performance. If a cache is present, and, depending on the applied encryption algorithm, encryption of addresses may introduce considerable additional delay. It should be noted that memory access latency is in a lot of cases already a main limiting factor for CPU performance improvement. However, when using space-filling curves for definition of the address space mapping conservation of the address locality to some degree may be possible, as a space-filling curve by its nature contains some locality. Alternatively to the use of space-filling curves pseudo-random address obfuscation may be used.

Indeed the space-filling curves, because of their locality preserving, may improve the performance of the obfuscation, but in case of cache it is only important to have locality preserved for the data in a cache line, while cache lines could be in any order. Thus in case of cache it may be desirable to have two levels obfuscation: one which preserves locality on small amounts of data, e.g. with size of the cache line, and another which might not preserves the locality but should be very efficient. Such a construction may not only improve overall cache performance, due to less or reduced latency, but may also improve the security provided by the obfuscation.

The aspects and embodiments defined above and further aspects of the invention are apparent from the examples of embodiment to be described hereinafter and are explained with reference to these examples of embodiment. It should be noted that features described in connection with a specific exemplary embodiment or exemplary aspect may be combined with another exemplary embodiment or another exemplary aspect.

BRIEF DESCRIPTION OF THE DRAWINGS

The invention will be described in more detail hereinafter with reference to examples of embodiment but to which the invention is not limited.

FIG. 1 schematically illustrates a processing system according to an exemplary embodiment.

DESCRIPTION OF THE EMBODIMENTS

The illustration in the drawing is schematic. In different drawings, similar or identical elements are provided with similar or identical reference signs. In connection with FIG. 1 some basic principles of a processing system for an obfuscation method and of an obfuscation method will be described.

FIG. 1 schematically illustrates a processing system 100 comprising a central processing unit (CPU) 101, having an associated cache 102. An output of the cache 102 is connected to an address translation unit (ATU) 103 which is in turn connected to an external or main memory 104. The above described components of the processing system are connected by data bus 105. Furthermore, different cache lines 106 are schematically indicated in the cache 102 wherein each cache line comprises a plurality of words of the size w.

In the following the function of the method will be described in more detail. In case of an instruction cache mechanism between a program control unit (PCU) and the ATU, the instruction addresses captured by the ATU may not follow the order $pa_{k+1}=pa_k+1$ (where $pa_k$ is a program address). Indeed, the cache requests the fetch of a cache line when the instruction to be fetched is not yet cached. As it is not possible to predict the order of successive fetches of cache lines from memory, reconstruction of the obfuscation mapping cannot depend on this. A parametric mapping function between unobfuscated and obfuscated addresses is desirable.

Typically a cache will fetch the missing cache line by making use of burst access mode to the memory. If the ATU splits this request in several requests to scattered memory locations this may severely degrade performance at each cache miss and eventually also increasing load on a memory controller or degrading performance of a memory controller cache. Therefore, it is preferable that the obfuscation mapping conserves at least part of the locality in a cache line, reducing the number of requests of the ATU to the memory for one cache line request from the CPU. On one hand locality preservation can be partly satisfied by using space-filling techniques. On the other hand, a two-level approach in the obfuscation may be better from a performance perspective: a first, global mapping which reorders blocks with the size of a cache line and a second local permutation inside the block.

The case when the ATU 103 is inserted between the CPU cache and the memory is shown in FIG. 1. The ATU 103 receives as input the instruction addresses following the cache misses and translates the instruction addresses according to its internal rules. The outputs of the ATU are the addresses of the instructions as stored in the memory.

The CPU includes the processing unit as well as a standard bus interface (e.g. ARM9 with AMBA) and the cache mechanism (e.g. ARM9, TriMedia, REAL16024c . . . ). The cache fetches w atoms each cycle, which may be called word size of the bus (with $w=2^n$ atoms).

An atom may be considered as the unity of data to be permuted to realize the obfuscation. This can be a byte but also less bits, a single bit or several bytes up to the word length (in that latest case $w=1=2^0$) but $w=2^n$ must be satisfied with n as integer.

The cache keeps copies of memory organized by lines, the lines have size $v=2^k w$ atoms (i.e. $v=2^{k+n}$) For the following the total size of the memory is denoted by $N=2^m$, but a program will take only part of the whole space. Thus the obfuscation tool needs to maps only part of the memory which will hold the obfuscated program. In order to simplify the explanation in the following N is considered to be the size of the obfuscated program instead of the memory size.

According to an exemplary embodiment two levels of obfuscation are used:

The first level maps a block of memory to a cache line, i.e. it is a permutation over v atoms. It should be noted that the first level mapping can work on different atom levels, providing different security (obfuscation) level and efficiency. For example a linear feedback shift register (LFSR) of length u over a finite field $GF(2^l)$ such that $u*l=k+n$ will produce a single atom-to-atom mapping (i.e. a (k+n)-bit address) in u cycles and the full block mapping in u*v cycles. Initial state of the LFSR should be different per block so it can be based for example on the current de-obfuscated block address (the upper m-k-n bits) and a unique secret, i.e. key. In this way the atoms in the cache line are reordered.

The second level reorders the cache lines to memory blocks, i.e. maps obfuscated block address to block address. Since a program has N/v blocks, a permutation over $2^{m-k-n}$ is used. A possible solution is an LFSR of length y over a finite field $GF(2^x)$ such that $y*x=m-k-n$. Such an LFSR will do the mapping in y cycles, namely setting the LFSR state with the (m-k-n)-bit input address, then clocking it y times and interpreting the resulting state as output address. Again as it was the case for level one technique a key can be used to make the mapping more secure.

It should be noted that for both level permutations, it is not important to preserve locality, instead they may minimize the latency. So in general any permutation may also be used: examples are block and stream ciphers, hash functions or message authentication codes.

Furthermore it should be noted that in the case of LFSR, address 0x0 cannot be obfuscated, since an LFSR with state 0 stays 0, i.e. no mapping is performed. Thus a special case may be made for 0.

For the LFSR example given on the first level fetching obfuscated data to the ATU will take $2^k$ cycles, reordering data will take u*v cycles and fetching reordered data from ATU to cache again $2^k$ cycles, so in total $2*2^k+u*v$ cycles, if no pipeline optimisation is applied. For the LFSR example given in the second level one needs y more cycles. Thus the total cost of the obfuscation in the considered example is $2*2^k+u*v+y$ instead of $2^k$ cycles in the unobfuscated case.

It should be mentioned that the two levels of obfuscation may be performed "independently", namely the address space (see table below) is divided in two separate parts. But if the obfuscated code of the second level is used as an additional input for the obfuscation of the first level one can achieve better security.

TABLE 1

| Total address space $N = 2^m$ | | |
|---|---|---|
| Number of blocks $N/v = 2^{m-k-n}$ | Number of atoms per cache line $v = 2^{k+n}$ | |
| | Number of words per cache line $v/w = 2^k$ | Word length in atoms $w = 2^n$ |
| Address encoding m bits | | |
| Second level obfuscation m - k - n bits | First level obfuscation k + n bits | |

In the following a numerical example is given for further describe an exemplary embodiment:

For the following a K8 core in the AMD Athlon 64 CPU is considered:

Considering a 2 bit-level obfuscation results in: one atom=2 bits, w=16*4, i.e. n=6 and v=64*4, i.e. k=2.

In case of an obfuscated program with size 16 KB, i.e. N=16*1024*4 atoms and hence m=16 the 2 LFSRs solution (shown as an example above) will need 8+u*256+y cycles.

LFSR level one must satisfy u*l=8, e.g. u=4 and l=2
LFSR level two must satisfy y*x=8, e.g. y=4 and x=2
Total cycles become in that case=8+4*256+4=1036 cycles For a smaller and more efficient implementation one may consider a three levels approach:
  permutation of the atoms within a word
  permutation of the words within a cache line
  permutation of the blocks In that case the ATU may not need to retrieve the full cache line before applying the permutation, it may compute the de-obfuscated addresses of one word, fetch it, reorder it and send it to the cache so the time to fill the cache line will be shorter thanks to the possibility for pipeline optimization.

Another possible implementation that brings some flexibility in the first (and most costly) level is, instead of mapping the whole set of atoms to a new reordered set of atoms, to pick up two atoms and swap them, pick up two others and swap them, etc. Ideally for a complete shuffling the swaps should be applied once per atom but one may decide to apply only a limited number of swaps as a compromise between performance and security.

To decide which atoms to swap at each step, this requires two pseudo-random atom positions. For example an LFSR of length u over a finite field $GF(2^l)$ such that $u*l=2*(k+n)$ will produce the positions of the two atoms to swap (i.e. two (k+n)-bit addresses) in u cycles and all the desired swaps within one block in u*z cycles with z chosen between 1 and v. The total for both LFSRs becomes $2*2^k+u*z+y$ cycles.

Taking again the same K8 core, with one atom=one byte, w=16, i.e. n=4 and v=64, i.e. k=2, if one chooses to apply 16 swaps, altering up to half of the bytes, with u*l=12, e.g. u=4 and l=3 this will require 8+4*16+4=76 cycles.

Yet another possible optimization may be to use look up tables (LUT) for a fixed atom-to-atom mapping which will require v*(k+n) bits of memory and v cycles to be executed. In this context "fix" means that the key will not be different per block. An example using the same core might be a byte-level obfuscation where we have: one atom=one byte, w=16, i.e. n=4 and v=64, i.e. k=2, can be executed in $2*2^k+v+y=8+64+4=76$ cycles using LUT of 64 bytes.

Summarizing a method according to an exemplary embodiment may be used alone. It may be combined with other obfuscation techniques: opaque data types, symbol name eliminated or made opaque, dynamic code generation . . . . It should be noted that the level of protection offered by such a method may mainly against reverse-engineering of an offline copy of the software, but it may rather be easy to defeat the protection (especially the second level) if the address bus or data bus can be spied on a running instance.

In general the method may be used to obfuscate any software code. There are several degrees of freedom in the application of this method:
  The choice of the granularity of the basic blocks.
  The choice of the ATU implementation technique.
  The choice on whether there are one or more secrets per chip, giving one or more possible mappings on the same chip.
  The choice on whether all the software for a given target chip is to be obfuscated or only some of it (this may imply that there should be some way to trigger the ATU translation or not).
  The choices for the permutations in both levels.
  The secret can be hardcoded in the SDK and ATU or possibly it may be possible to dynamically load a new secret (in a secure way).

This method may be applied on any core with cache or without cache.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of obfuscating a code, the method comprising:
  performing, with an address translation hardware device, a first level obfuscating technique on a code to generate a first obfuscated code while conserving at least part of a locality in a cache line;
  performing a second level obfuscating technique on the first obfuscated code to produce a second obfuscated code, wherein the first level obfuscating technique preserves locality while the second level obfuscating technique emphasizes efficiency; and
  hardcoding one secret per wafer into the address translation hardware device.

2. The method according to claim 1, further comprising:
  mapping between an address space of an execution path and an obfuscated address space.

3. The method according to claim 2, wherein the mapping is based on a space filling curve.

4. The method according to claim 1, wherein the mapping is based upon a parametric mapping function using a secret as a parameter of the mapping function.

5. The method according to claim 1, wherein the second obfuscated code of the second level obfuscating technique is used as an additional input for the obfuscation of the first level obfuscating technique.

6. The method of claim 1, wherein the address translation hardware device comprises a linear feedback shift register (LFSR).

7. The method of claim 1, wherein the first level obfuscating technique and the second level obfuscating technique are performed independently.

8. The method of claim 1, further comprising:
  preventing reverse engineering of software code with the secret hardcoded in the address translation hardware device.

9. The method of claim 1, further comprising:
  hardcoding one secret per processor.

10. The method of claim 1, further comprising:
  hardcoding one secret per customer.

11. The method of claim 1, further comprising:
  hardcoding one secret per application.

12. A processing system comprising:
  a processor with a cache,
  an external memory, and the address translation hardware device, wherein the address translation hardware device is arranged between the cache and the external memory and configured to perform a first level obfuscating technique on a code to generate a first obfuscated code while conserving at least part of a locality in a cache line, perform a second level obfuscating technique on the first obfuscated code to produce a second obfuscated code, wherein the first level obfuscating technique preserves locality while the second level obfuscating technique emphasizes efficiency and one secret per wafer is hardcoded into the address translation hardware device.

13. A non-transitory medium, in which a computer program is stored which, when being executed by a processor, is configured to control a plurality of instructions, the non-transitory medium comprising:
    instructions for performing, with an address translation hardware device, a first level obfuscating technique on a code to generate a first obfuscated code while conserving at least part of a locality in a cache line;
    instructions for performing a second level obfuscating technique on the first obfuscated code to produce a second obfuscated code, wherein the first level obfuscating technique preserves locality while the second level obfuscating technique emphasizes efficiency; and
    instructions for hardcoding one secret per wafer into the address translation hardware device.

14. A method of obfuscating a code, the method comprising:
    performing, with an address translation hardware device, a first level obfuscating technique on a code to generate a first obfuscated code while conserving at least part of a locality in a cache line;
    performing a second level obfuscating technique on the first obfuscated code to produce a second obfuscated code, wherein the first level obfuscating technique preserves locality while the second level obfuscating technique emphasizes efficiency; and
    hardcoding one secret per batch of chips into the address translation hardware device.

15. The method according to claim 14, further comprising:
    mapping between an address space of an execution path and an obfuscated address space.

16. The method according to claim 15, wherein the mapping is based on a space filling curve.

17. The method according to claim 14, wherein the mapping is based upon a parametric mapping function using a secret as a parameter of the mapping function.

18. The method according to claim 14, wherein the second obfuscated code of the second level obfuscating technique is used as an additional input for the obfuscation of the first level obfuscating technique.

19. The method of claim 14, wherein the address translation hardware device comprises a linear feedback shift register (LFSR).

20. The method of claim 14, wherein the first level obfuscating technique and the second level obfuscating technique are performed independently.

21. The method of claim 14, further comprising:
    preventing reverse engineering of software code with the secret hardcoded in the address translation hardware device.

22. The method of claim 14, further comprising:
    hardcoding one secret per processor.

23. The method of claim 14, further comprising:
    hardcoding one secret per customer.

24. The method of claim 14, further comprising:
    hardcoding one secret per application.

25. A processing system comprising:
    a processor with a cache,
    an external memory, and the address translation hardware device, wherein the address translation hardware device is arranged between the cache and the external memory and configured to perform a first level obfuscating technique on a code to generate a first obfuscated code while conserving at least part of a locality in a cache line, perform a second level obfuscating technique on the first obfuscated code to produce a second obfuscated code, wherein the first level obfuscating technique preserves locality while the second level obfuscating technique emphasizes efficiency, and one secret per batch of chips is hardcoded into the address translation hardware device.

26. A non-transitory medium, in which a computer program is stored which, when being executed by a processor, is configured to control a plurality of instructions, the non-transitory medium comprising:
    instructions for performing, with an address translation hardware device, a first level obfuscating technique on a code to generate a first obfuscated code while conserving at least part of a locality in a cache line;
    instructions for performing a second level obfuscating technique on the first obfuscated code to produce a second obfuscated code, wherein the first level obfuscating technique preserves locality while the second level obfuscating technique emphasizes efficiency; and
    instructions for hardcoding one secret per batch of chips into the address translation hardware device.

* * * * *